July 3, 1962  M. A. LOBEL  3,041,734
DIAL INDICATOR

Filed Oct. 3, 1958  3 Sheets-Sheet 1

INVENTOR
MARTIN A. LOBEL
BY
J. Jordan Kunik
ATTORNEY

July 3, 1962  M. A. LOBEL  3,041,734
DIAL INDICATOR
Filed Oct. 3, 1958  3 Sheets-Sheet 2
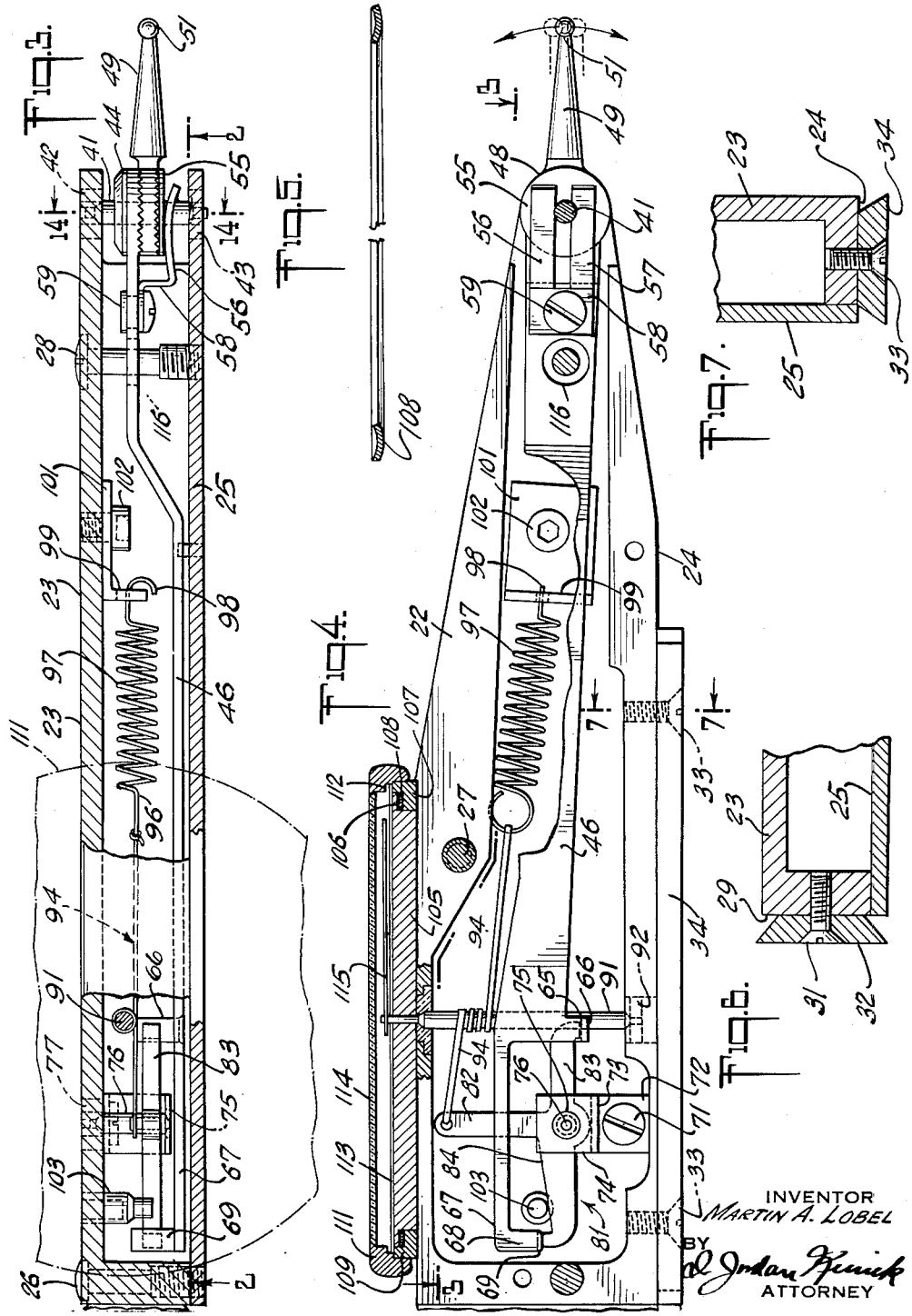
INVENTOR
MARTIN A. LOBEL
BY
ATTORNEY July 3, 1962  M. A. LOBEL  3,041,734
DIAL INDICATOR
Filed Oct. 3, 1958  3 Sheets-Sheet 3
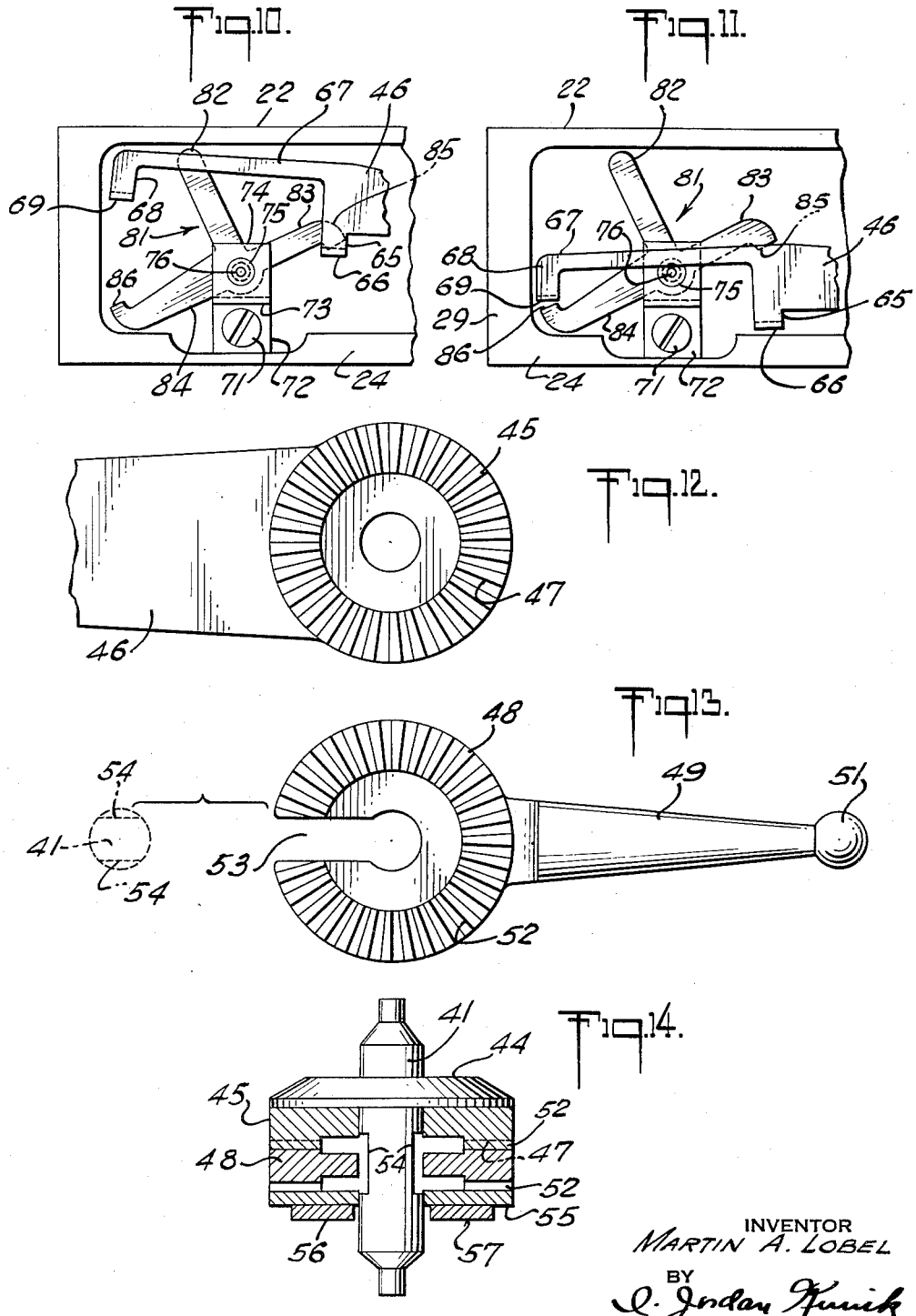
INVENTOR
MARTIN A. LOBEL
BY
ATTORNEY

United States Patent Office 3,041,734
Patented July 3, 1962

3,041,734
DIAL INDICATOR
Martin A. Lobel, 82 Penn Drive, West Hartford, Conn., assignor of twenty percent to Arthur R. Carling, twenty percent to David E. Alton, twenty percent to Abraham D. Horn, and twenty percent to Nathan Aaron, all of West Hartford, Conn.
Filed Oct. 3, 1958, Ser. No. 765,171
3 Claims. (Cl. 33—172)

This invention relates to dial indicators.

The dial indicator of the present invention comprises novel structures and arrangement of parts which result in improved sensitivity and versatility of the measuring instrument used by machinists and toolmakers. The sensitivity of the present instrument is achieved by a new arrangement for magnifying the motion of the feeler finger by means of an elongated lever which operates a bell crank having a radially extending arm which in turn produces rotation of the dial pointer shaft.

Furthermore, by means of a novel structural arrangement the bell crank is operated unidirectionally by either of the bidirectional movements of the feeler finger of the instrument so that the indicator dial scale is read in only one direction by the operator thereby eliminating confusion when measurements are taken in different directions relative to the work piece.

The use of the bell crank arrangement herein automatically eliminates several component parts that would otherwise have to be present in the instrument, thereby greatly reducing the overall internal frictional loading of the instrument.

Also, the delicate elements of the instrument are protected by the use of a flat filament of nylon or the like helically wound around the dial pointer shaft, said filament having a controlled resilience without sacrificing any dimensional measuring stability of the instrument. Additionally the dial pointer shaft has an aperture through which the filament is laced and wedged so that positive rotation of the dial pointer shaft is ensured without incurring lost motion.

Still other objects and advantages of my invention will be apparent from the specification.

The features of novelty which I believe to be characteristic of my invention are set forth herein and will best be understood, both as to their fundamental principles and as to their particular embodiments, by reference to the specification and accompanying drawings, in which:

FIG. 3 is a greatly enlarged top view, partly in cross-section and partly broken away, taken on line 3—3 of FIG. 4;

FIG. 4 is a greatly enlarged side view, taken along line 4—4 of FIG. 3, some parts being shown in section, other parts in phantom outline and others partly broken away;

FIG. 5 is a greatly enlarged section view of a broken away portion of the wave spring shown in the dial assembly of FIG. 4;

FIG. 6 is an enlarged section view of a dovetail plate mounted on the rear end of the indicator;

FIG. 7 is a section view, taken on line 7—7 of FIG. 4;

FIG. 10 is a greatly enlarged broken away view of the rear end of the dial indicator showing the cooperation between the indicator lever and rocker arm when the lever is raised;

FIG. 11 is similar to FIG. 10, showing the relative positions of the rocker arm and lever when the latter is lowered;

FIG. 12 is a greatly enlarged side view of the forward end of the indicator lever;

FIG. 13 is a greatly enlarged side view of the indicator pointer and its relationship to the shaft around which it is mounted; and FIG. 14 is a partial section view taken on line 14—14 of FIG. 3, some parts being shown in elevation.

Figure 1:
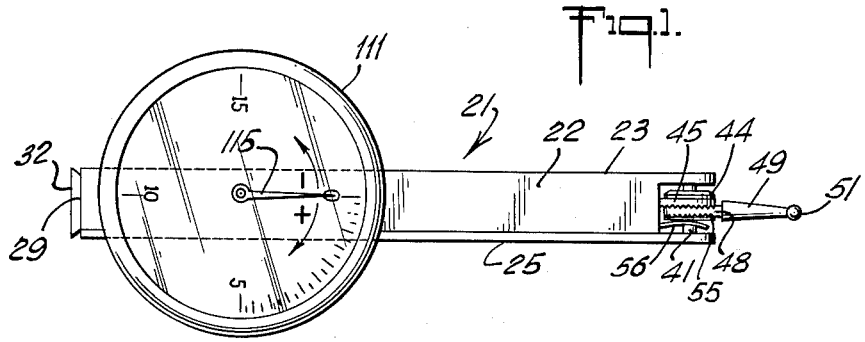
FIGURE 1 is a top view, partly in phantom outline, of the dial indicator of the present invention.
Figure 2:
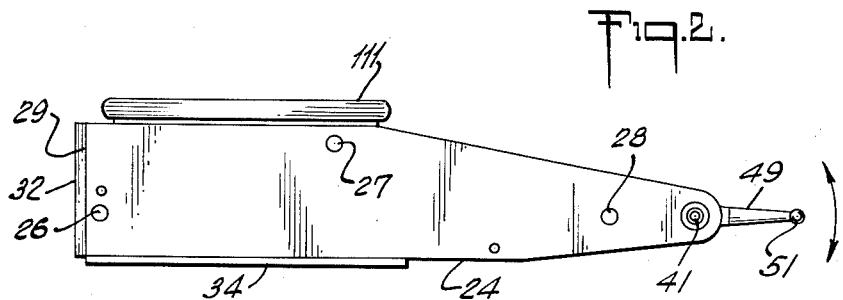
FIG. 2 is a side view of the indicator shown in FIG. 1.

Referring now to the drawings in detail, and particularly to FIGS. 1, 2, 3, and 4, the dial indicator of the present invention comprises a housing, generally designated 21, having a top wall 22, a side wall 23, and a bottom wall 24, forming a chamber within which some of the operating parts of the instrument are enclosed. Said chamber is enclosed by a cover plate 25 which is secured to said housing by means of screws 26, 27, and 28, or the like.

Attached to the rear end wall 29 of housing 21 by means of a pair of screws 31 is a dovetail plate 32, by means of which the dial indicator may be secured to a suitable arm or the like (FIG. 6). Attached to bottom wall 24 of housing 21 by means of screws 33, is an elongated dovetail plate 34 (FIG. 7) which is adapted to cooperate with a suitable dovetail slot of an arm, not shown, as is employed with standard measuring instruments.

The forward ends of rear wall 23 and cover plate 25 extend beyond the ends of walls 22 and 24, thereby forming a pair of spaced apart arms which support a pivot shaft 41 between them. The respective ends of shaft 41 are rotatably supported in jewel bearings 42 and 43 mounted in rear wall 23 and cover plate 25, respectively. Pivot shaft 41 has a circular flanged plate 44 which may either be mounted fast thereon, or which may be formed by machining said shaft and said plate out of one piece of stock.

Mounted pivotally on shaft 41 is the forward rounded end 45 of an elongated lever 46 which extends longitudinally and rearwardly through the chamber of housing 21. One lateral surface of the forward end 45 of lever 46 has a circular array of radial serrations 47 formed therein, said array being disposed concentrically relative to shaft 41. Also mounted pivotally around shaft 41 is the generally circular shank 48 of the dial indicator feeler or finger comprising an elongated shaft 49, the outer end of which terminates in a spherical head 51 for application to a surface of the work piece whose position is to be measured or determined.

Each of the lateral surfaces of shank 48 has a circular array of radial serrations 52 formed therein which are equal in number and dimension to the serrations 47 formed on the forward end 45 of lever 46. Said arrays are also disposed concentrically relative to shaft 41.

Shank 48 of the indicator finger has a longitudinal slot 53 which is slidably accommodated by a pair of parallel flats 54 intermediate the ends of shaft 41 which enable said finger to be inserted over and removed from said shaft at will.

When feeler finger is mounted on pivot shaft 41, serrations 52 on one side thereof mate with and intimately engage serrations 47 on the forward end 45 of lever 46. Ring 55 positioned around pivot shaft 41 is urged against shank 48 by means of a bifurcated spring comprising a pair of spaced apart curved resilient tines 56 and 57 formed integrally with an L-shaped base 58 secured by means of stud 59 to lever 46.

Spring tines 56 and 57 straddle shaft 41 and cause serrations 52 to be urged into intimate contact with serrations 47 of lever 46, whereby any angular motion of the finger is translated directly into equivalent angular motion of lever 46.

Serrations 47 and 57 are each formed with the requisite degree of precision whereby no lost motion is encountered by lever 46 when head 51 of the indicator finger is moved in either direction indicated in FIG. 4. Thus lever 46 responds pivotally with the highest degree of sensitivity when head 51 is moved by the work piece to which it is applied. Since lever 46 is several times longer than the feeler finger, any pivotal motion of the latter will be multiplied at the rear end of said lever.

Since shank 48 is serrated on both sides, the indicator finger may be reversed in position relative to the serrations of lever 46 in the event that head 51 becomes worn. Also, the provision of the identical circular arrays of uniform serrations 45 and 52 permits the feeler finger to be located in a broad range of desired angular positions relative to lever 46.

The intermediate portion of lever 46 is bent whereby the rear portion thereof is spaced a short distance from the interior surface of cover plate 25 in order to permit the accommodation of various other components of the indicator within the narrow confines of housing 21. See FIG. 3. The rear end of lever 46 has a short downwardly extending leg 65 which terminates in a laterally extending lug 66. Lever 46 also has a rearwardly extending arm 67 having a downwardly extending leg 68 terminating in a laterally extending lug 69. FIGS. 3, 4, 10, 11.

Connected to the rear wall 23 of housing 21 by means of screw 71 is a bracket 72 having a horizontal arm 73 extending toward cover plate 35 and terminating in an upwardly extending lug 74. Mounted on lug 74 is jewel bearing 75 which rotatably supports one end of pivot shaft 76, the other end of which is rotatably supported in jewel bearing 77, mounted in rear wall 24 of housing 21. The axis of pivot shaft 76 is arranged substantially parallel to the axis of shaft 41.

Mounted fast on pivot shaft 76 is a bell crank, generally designated 81, having an upwardly radially extending rocker arm 82, a forwardly extending leg 83, and a rearwardly extending leg 84. Forwardly extending leg 83 has a downwardly extending toe 85, which is in continuous engagement with lug 66 of lever leg 65. Rearwardly extending leg 84 has an upwardly extending toe 86, which is in continuous engagement with lug 69 of lever leg 68.

By means of this arrangement, when the rear end of lever 46 rises (FIG. 10), lug 66 lifts toe 85 to cause bell crank 81 to rotate in a counterclockwise direction. Alternatively, when the rear end of lever 46 descends (FIG. 11), lug 69 depresses toe 85 to cause bell crank 81 to rotate in the same counterclockwise direction. It will be noted that the illustration in FIG. 4 shows lever 46, bell crank 81, and the feeler finger in the neutral or zero position. In other words, either of the bidirectional movements of head 51 of the feeler finger and lever 46 result in the unidirectional motion of bell crank 81 and accordingly of rocker arm 82 relative to said neutral position, as clearly shown in FIGS. 10 and 11.

The dimensions of legs 83 and 84 of bell crank 81, and the disposition of toes 85 and 86, and of lugs 66 and 69, respectively, are spatially arranged whereby substantially the same degree of rotation is imparted to bell crank 81 by either the upward or downward movement of the rearward end of lever 46.

Figure 8:
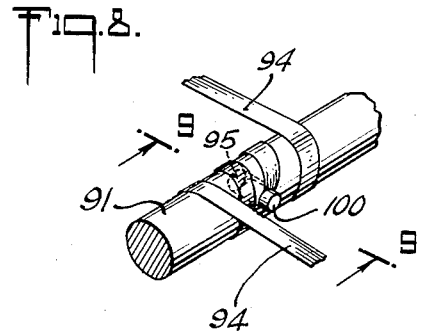
FIG. 8 is a greatly enlarged perspective view of the dial spindle of the indicator showing the manner in which its drive filament is connected thereto.
Figure 9:
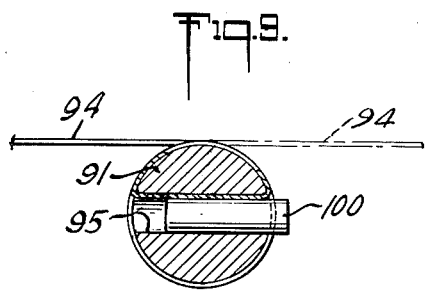
FIG. 9 is a still further enlarged section view taken on line 9—9 of FIG. 8.

Positioned vertically within the interior of housing 21 is a dial pointer shaft 91, its lower end being rotatably supported in jewel bearing 92 mounted in bottom wall 24, and its upper end being rotatably supported in jewel bearing 93 mounted in top wall 22. Connected by suitable means to the upper end of rocker 82 is one end of a flat nylon filament 94, wrapped helically around shaft 91, and laced through transverse aperture 95 intermediate the ends of said shaft (FIGS. 8 and 9), the other end of said filament being connected to loop 96 of tension spring 97. The other end of spring 97 is connected by loop 98 to the laterally extending lug 99 of bracket 101, secured by screw 102 to rear wall 23 of housing 21. It will be noted, particularly from the illustration in FIG. 8, that an equal number of windings of filament 94 are disposed on either side of aperture 95 whereby a balanced tension is maintained on shaft 91.

In some embodiments, a plug 100 may be inserted into aperture 95 of shaft 91 to securely wedge filament 94 therein, thereby preventing said filament from shifting its position relative to the circumference of said shaft. Plug 100 may be made of a plastic material such as nylon or the like, or of wood, metal or any other suitable material. Plug 100 may be secured into aperture 95 by a press fit or by means of a suitable cementitious material.

The action of spring 97 continuously exerts its force upon filament 94 which in turn causes rocker arm 82 normally to be rotated in a clockwise direction to a zero or neutral position as shown in FIG. 4. This zero position may be determined by a laterally extending stop stud 103 mounted in rear wall 23 and against the periphery of which the upper edge of rearwardly extending leg 86 abuts, thereby limiting the clockwise rotation of bell crank 81.

The upper end of shaft 91 extends through and rotates freely in a suitable vertical aperture within a circular disc plate 105 secured by screws or other suitable means, not shown, to top wall 22 of housing 21 (FIG. 4).

The top of disc plate 105 has a peripheral flange 106, spaced apart from the top of wall 22. Surrounding the bottom portion of disc plate 105 is a ring 107, the upper surface of which is spaced a short distance from the bottom surface of flange 106. Positioned between the bottom surface of flange 106 and the top surface of ring 107 is a circular wave spring 108 (FIG. 5), which causes said ring to be urged against the horizontal surface of wall 22 of housing 21. Ring 107 has an upwardly extending flange 109 which accommodates by a light press fit a circular bezel 111 which has an annular shoulder 112 adapted to retain dial plate 113 against the top surface of disc plate 105. Dial plate 113 also has a central aperture through which the upper end of shaft 91 extends and freely rotates. Bezel 111 has a glass or transparent plastic crystal 114 cemented or otherwise secured therein to cover the indicator dial. Attached to the upper end of shaft 91 is a needle pointer 115 which, when said shaft rotates, moves to indicate its degree of rotation upon the calibrations on dial plate 113.

The periphery of dial plate 113 is in frictional engagement with an internal annulus of bezel 111 whereby the manual rotation of bezel 111 causes the rotation of said dial plate relative to stationary disc 105 to bring the zero mark on said dial plate into alignment with the outer end of pointer 115.

Lever 46 has an aperture 116, through which screw 28 extends (FIGS. 3, 4). It will be noted that the diameter of aperture 116 is considerably greater than the diameter of the shank of screw 28 whereby the pivotal motion of lever 46 is permitted without interference by said screw.

In operation the dial indicator instrument of the present invention may be readily utilized to measure relative positions of work pieces in either of two directions since head 51 of the finger is bidirectional in action from a neutral or zero position. The pivotal movement of the finger in either direction is translated without lost motion through the assembly of the elements on shaft 41 to lever 46. The consequent pivotal motion of lever 46 in either of two directions from a zero or neutral position is translated into unidirectional movement of bell crank 81, and by way of filament 94 into unidirectional rotation of indicator shaft 91 and of pointer 115. Thus, dial plate 113 is calibrated in measurement gradations in one circular direction so that confusion in reading the dial is obviated.

Since bell crank 81 is operable for its measurement functions unidirectionally from a neutral or zero reference point, it is necessary to provide only one stop stud 103 to which the bell crank is returned by the action of spring 97 and filament 94. Thus, the biasing action of spring 97 provides continuous tension on filament 94 whereby head 51 of the feeler finger, lever 46, and bell crank 81, indicator dial shaft 91 and dial pointer 115 are all normally maintained in respective zero or neutral positions as reference points from which measurements may be derived.

In some measurement operations, it may be desirable to impose an initial external dead loading on head 51 of the feeler finger in order to provide a zero reference point other than that established by the natural dynamic balance of the elements shown in FIG. 4. In such a case, the new neutral position will be indicated by rotating dial plate 113 so that its zero mark is brought into alignment with the outer end of pointer 115 at its new neutral position.

The sensitivity of the dial indicator instrument herein is enhanced by the use of a substantially flat-sided filament 94 of nylon, for example, or other suitable similar material, which is maintained under tension by spring 97. By using a flat filament rather than a round thread or the like, the helical winding thereof around shaft 91 provides a greater area of purchase between said filament and said shaft whereby lost motion is substantially eliminated. Also, lost motion is further controlled by securing filament 94 to shaft 91 with wedge plug 100.

Furthermore, the effective multiplying factor that the flat filament 94 transmits to shaft 91 is substantially uniform in contrast to that which would be produced by a filament of round cross section, which would flatten or otherwise become distorted non-uniformly under the spring tension applied thereto.

The use of nylon for filament 94 is particularly advantageous since it possesses minimal but sufficiently controlled resilience to protect the delicate mechanisms of the indicator instrument should the feeler finger be subjected to sudden shocks or movement which would otherwise break the filament. This resilience of the filament does not, however, effect its dimensional stability and, therefore, the exact reproducibility of its measuring function is maintained over extended use.

The combination of the helical winding of filament 94 and its extension through an aperture in shaft 91 ensures a hitherto unobtainable reproducibility of measurement in the field of dial indicators. By virtue of the structures disclosed and described herein, the dial indicator of the present invention is capable of differentiating spatial measurements to a degree of .000025″.

By providing for spaced apart portions of lever 46 alternatively to engage corresponding spaced apart portions of bell crank 81, it is possible for said lever and said bell crank to move in substantially parallel planes spaced a short distance apart and at the same time provide for either of the opposite measuring movements of head 51 of the feeler finger and of lever 46 to be translated into unidirectional movement of said bell crank and consequently of dial pointer 115 from a zero reference point on the graduated scale imprinted, engraved or otherwise applied to dial face 113. The bell crank, as described and claimed herein, may constitute any type of pivotable or rotatable member on which two spaced apart portions are engageable separately by another member moving alternatively in either of two opposite directions to produce unidirectional movement of said bell crank.

Moreover, the sensitivity of the dial indicator instrument herein is attributable in large part to the novel means for multiplying the angular motion of the relatively short feeler finger by the relatively long lever 46, and to the elimination of various friction producing elements that are present in other dial indicators. The contact pressure of head 51 of the feeler finger is extremely light since so little aggregate friction is produced by the elements of the present indicator described and claimed herein.

In the specification, I have explained the principles of my invention, and the best mode in which I have contemplated applying those principles, so as to distinguish my invention from other inventions; and I have particularly pointed out and distinctly claimed the part, mode or combination which I claim as my invention or discovery.

While I have shown and described certain preferred embodiments of my invention, it will be understood that modifications and changes may be made without departing from the function and scope thereof, as will be clear to those skilled in the art.

I claim:

1. An indicator comprising a housing, a feeler finger pivotally mounted on said housing, a lever connected at one end to said finger and pivotable therewith, said lever being substantially greater in length than said finger whereby the distance traversed by the outer end of said finger is greatly amplified by the other end of said lever, an indicator shaft mounted in said housing and rotatable on its own axis, a bell crank pivotally mounted within said housing, a pair of oppositely extending legs on said bell crank, each of said legs being in continuous engagement with spaced apart portions of said other end of said lever whereby the movement of said lever produces a unidirectional movement of said bell crank, a radially extending arm on said bell crank, and a spring mounted within said housing, a single filament, one end of said filament being connected to said spring, the other end of said filament being connected to the outer portion of said arm, an intermediate portion of said filament being helically wound around said shaft, said filament being made of a plastic material having a minimal but sufficiently controlled resilience to protect the instrument when said finger is subjected to sudden shocks without sacrificing any dimensional stability of said filament, and an aperture in said indicator shaft intermediate its ends, an intermediate portion of said filament within said helical winding being laced through said aperture.

2. An indicator according to claim 1, and further comprising a plug inserted into said aperture and securing said filament therein.

3. An indicator according to claim 2 wherein an equal number of windings of said filament are disposed at either side of said aperture to produce a substantially balanced tension on said shaft.

References Cited in the file of this patent

UNITED STATES PATENTS

| | | |
|---|---|---|
| 607,898 | Todd | July 26, 1898 |
| 917,444 | James | Apr. 6, 1909 |
| 1,466,664 | Lowe | Sept. 4, 1923 |
| 1,594,536 | Ludlow | Aug. 3, 1926 |
| 2,574,723 | Ames | Nov. 13, 1951 |